United States Patent
Futakami

(10) Patent No.: US 9,374,723 B2
(45) Date of Patent: Jun. 21, 2016

(54) COMMUNICATION MANAGEMENT SYSTEM AND COMMUNICATION MANAGEMENT METHOD

(71) Applicant: Komatsu Ltd., Tokyo (JP)

(72) Inventor: Masanao Futakami, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/350,880

(22) PCT Filed: Nov. 19, 2013

(86) PCT No.: PCT/JP2013/081218
§ 371 (c)(1),
(2) Date: Mar. 4, 2015

(87) PCT Pub. No.: WO2015/029269
PCT Pub. Date: Mar. 5, 2015

(65) Prior Publication Data
US 2015/0172936 A1 Jun. 18, 2015

(51) Int. Cl.
*H04M 3/00* (2006.01)
*H04W 24/04* (2009.01)
*G07C 5/00* (2006.01)
*H04M 1/725* (2006.01)
(Continued)

(52) U.S. Cl.
CPC .............. *H04W 24/04* (2013.01); *G07C 5/008* (2013.01); *H04M 1/72572* (2013.01); *H04W 48/18* (2013.01); *H04W 64/006* (2013.01)

(58) Field of Classification Search
CPC ... H04W 24/04; H04W 48/18; H04W 64/006; G07C 5/008; H04M 1/72572

USPC ............ 455/420, 436, 435.1, 440, 443, 456.1
See application file for complete search history.

(56) References Cited

U.S. PATENT DOCUMENTS

| 7,706,937 B2 | 4/2010 | Hasegawa et al. |
| 7,826,796 B2 | 11/2010 | Matsunaga |
| 8,103,220 B2 | 1/2012 | Matsunaga |

(Continued)

FOREIGN PATENT DOCUMENTS

| CN | 1825996 A | 8/2006 |
| CN | 1852347 A | 10/2006 |

(Continued)

OTHER PUBLICATIONS

International Search Report and Written Opinion dated Jan. 21, 2014, issued for PCT/JP2013/081218.

*Primary Examiner* — Khai M Nguyen
(74) *Attorney, Agent, or Firm* — Locke Lord LLP

(57) ABSTRACT

A communication management system in which a work machine communicates with an outside of the work machine, the communication management system includes: a work machine including: a communications carrier setting unit configured to set a communications carrier that provides a communication service to generate information about the set communications carrier as communications carrier information; and a communication unit configured to transmit the communications carrier information to the outside of the work machine; and a communication state analyzing unit configured to gather statistics on the communications carrier information included at two or more different times among pieces of the communications carrier information transmitted from the communication unit, the statistics gathering being performed for each of the times.

8 Claims, 10 Drawing Sheets

(51) Int. Cl.
*H04W 48/18* (2009.01)
*H04W 64/00* (2009.01)

(56) References Cited

U.S. PATENT DOCUMENTS

| | | | |
|---|---|---|---|
| 8,315,631 B2 | 11/2012 | Matsunaga | |
| 8,761,729 B2 | 6/2014 | Naito et al. | |
| 2010/0188252 A1* | 7/2010 | Numai | G01C 21/00 340/8.1 |
| 2011/0235686 A1* | 9/2011 | Kojima | G01S 19/426 375/141 |
| 2012/0047227 A1 | 2/2012 | Haggerty et al. | |
| 2012/0115439 A1 | 5/2012 | Naito et al. | |
| 2014/0153485 A1* | 6/2014 | Tsuda | H04W 36/32 370/328 |

FOREIGN PATENT DOCUMENTS

| | | |
|---|---|---|
| CN | 202178789 U | 3/2012 |
| CN | 102547924 A | 7/2012 |
| JP | 2004-207839 A | 7/2004 |
| JP | 2006-092017 A | 4/2006 |
| JP | 2007-235492 A | 9/2007 |
| JP | 2012-105075 A | 5/2012 |
| JP | 2012-109973 A | 6/2012 |
| JP | 2013-219438 A | 10/2013 |
| JP | 2013-219559 A | 10/2013 |

* cited by examiner

| IDM | IDC | | | | | |
|---|---|---|---|---|---|---|
| | d1 | d2 | d3 | ... | dj | ... |
| IDM1 | a | a | b | ... | a | ... |
| IDM2 | a | a | c | ... | a | ... |
| IDM3 | a | a | b | ... | a | ... |
| ⋮ | ⋮ | ⋮ | ⋮ | ⋮ | ⋮ | ⋮ |
| IDMn | a | a | c | ... | a | ... |
| ⋮ | ⋮ | ⋮ | ⋮ | ⋮ | ⋮ | ⋮ |

| IDM | d1 | | d2 | | ... | di | | ... |
|---|---|---|---|---|---|---|---|---|
| | IP | IDC | IP | IDC | ... | IP | IDC | ... |
| IDM1 | P1 | a | P1 | b | ... | P1 | a | ... |
| IDM2 | P2 | a | P2 | c | ... | P2 | a | ... |
| IDM3 | P3 | a | P3 | b | ... | P3 | a | ... |
| ⋮ | ⋮ | ⋮ | ⋮ | ⋮ | ⋮ | ⋮ | ⋮ | ⋮ |
| IDMn | Pn | a | Pn | c | ... | Pn | a | ... |
| ⋮ | ⋮ | ⋮ | ⋮ | ⋮ | ⋮ | ⋮ | ⋮ | ⋮ |

COMMUNICATION MANAGEMENT SYSTEM AND COMMUNICATION MANAGEMENT METHOD

FIELD

The present invention relates to a communication management system that manages states of communications between work machines and a management device, and to a communication management method.

BACKGROUND

There have been management systems that manage work machines such as construction machines (Patent Literature 1, for example). In many of such work machine management systems, a management device acquires information about work machines from terminal devices mounted on the work machines via a communication link.

CITATION LIST

Patent Literature

Patent Literature 1: Japanese Laid-open Patent Publication No. 2006-92017

SUMMARY

Technical Problem in some cases, a management system designed for work machines as described above uses a mobile phone network (mobile communications) to communicate information from work machines to a management device. In some cases, a work machine includes a communication device or the like that has the function to select and set one of communications carriers (telecommunications carriers) at the time of a mobile communication. When a mobile communication is performed, an abnormality might occur in the communications carrier (a telecommunications carrier) providing communication services to mobile devices such as mobile telephones. In such a case, the management device can recognize the abnormality in the communication when failing to receive information transmitted from the work machines or when sensing missing or defective information even if the management device has acquired information. However, it is difficult for the management device to identify the communications carrier having the abnormality.

The present invention aims to identify a mobile communications carrier having an abnormality when work machine information is transmitted from a work machine to a management device through a mobile communication.

Solution to Problem

According to the present invention, a communication management system in which a work machine communicates with an outside of the work machine, the communication management system comprises: a work machine including: a communications carrier setting unit configured to set a communications carrier that provides a communication service to generate information about the set communications carrier as communications carrier information; and a communication unit configured to transmit the communications carrier information to the outside of the work machine; and a communication state analyzing unit configured to gather statistics on the communications carrier information included at two or more different times among pieces of the communications carrier information transmitted from the communication unit, the statistics gathering being performed for each of the times. The communications carrier information may be acquired at different times.

In the present invention, it is preferable that the communication state analyzing unit generates time-series data by arranging the communications carrier information in chronological order after the statistics gathering.

In the present invention, it is preferable that the communication management system, further comprises a determining unit configured to determine whether an abnormality occurs in the communications carrier, from at least one of a change over time in the number of the pieces of the communications carrier information acquired by the communication state analyzing unit and a change over time in a rate of the communications carrier information among a plurality of the communications carriers.

According to the present invention, a communication management system in which a work machine communicates with an outside of the work machine, the communication management system comprises: a communications carrier setting unit configured to set a communications carrier that provides a communication service to generate information about the set communications carrier as communications carrier information, the communications carrier setting unit being mounted on the work machine; a position detecting unit configured to detect a position of the work machine and generate information about the detected position as positional information, the position detecting unit being mounted on the work machine; a communication unit configured to transmit the communications carrier information and the positional information to the outside of the work machine, the communication unit being mounted on the work machine; and a communication state analyzing unit configured to associate the communications carrier information and the positional information included at two or more different times with each other among pieces of the communications carrier information and the positional information transmitted from the communication unit, the associating being performed for each of the times. The communications carrier information and the positional information may be acquired at different times.

In the present invention, it is preferable that the communication management system, further comprises an output unit configured to display the communications carrier information associated with the positional information in a position on a map corresponding to the positional information.

In the present invention, it is preferable that the output unit displays the communications carrier information associated with the positional information in the position on the map corresponding to the positional information, the displaying being performed for each of the two or more different times.

According to the present invention, a communication management system in which a work machine communicates with an outside of the work machine, the communication management system comprises: the work machine including: a communications carrier setting unit configured to set a communications carrier that provides a communication service to generate information about the set communications carrier as communications carrier information; and a communication unit configured to transmit the communications carrier information to the outside of the work machine; a communication state analyzing unit configured to gather statistics on the communications carrier information included at two or more different times among pieces of the communications carrier information transmitted from the communication unit, the statistics gathering being performed for each of the times; and a determining unit configured to determine whether an abnormality occurs in the communications carrier, from at least one of a change over time in the number of the pieces of the communications carrier information acquired by the communication state analyzing unit and a change over time in a rate of the communications carrier information among a plurality of the communications carriers, wherein the communication state analyzing unit generates time-series data by arranging the communications carrier information in chronological order after the statistics gathering. The communications carrier information may be acquired at different times.

According to the present invention, a communication management method to be implemented where a work machine communicates with an outside of the work machine, the communication management method comprises: setting a communications carrier to be used by the work machine to perform communications, and generating information about the set communications carrier as communications carrier information; transmitting the communications carrier information to the outside of the work machine; gathering statistics on the communications carrier information included at two or more different times among pieces of the communications carrier information transmitted from the communication unit, the statistics gathering being performed for each of the times; and arranging the communications carrier information in chronological order after the statistics gathering. The communications carrier information may be acquired at different times.

According to the present invention, a communication management method to be implemented where a work machine communicates with an outside of the work machine, the communication management method comprises: setting a communications carrier to be used by the work machine to perform communications, and generating information about the set communications carrier as communications carrier information; transmitting the communications carrier information and positional information about the work machine to the outside of the work machine; associating the communications carrier information and the positional information included at two or more different times with each other among pieces of the communications carrier information and the positional information transmitted from the communication unit, the associating being performed for each of the times; and displaying the communications carrier information associated with the positional information in a position on a map corresponding to the positional information, the displaying being performed for each of the two or more times. The communications carrier information and the positional information may be acquired at different times.

The present invention can identify a mobile communications carrier having an abnormality when work machine information is transmitted from a work machine to a management device through a mobile communication.

DESCRIPTION OF EMBODIMENTS

Modes for carrying out the present invention (embodiments) are described below, with reference to the drawings.

First Embodiment

Outline of Communication System 1

Figure 1:
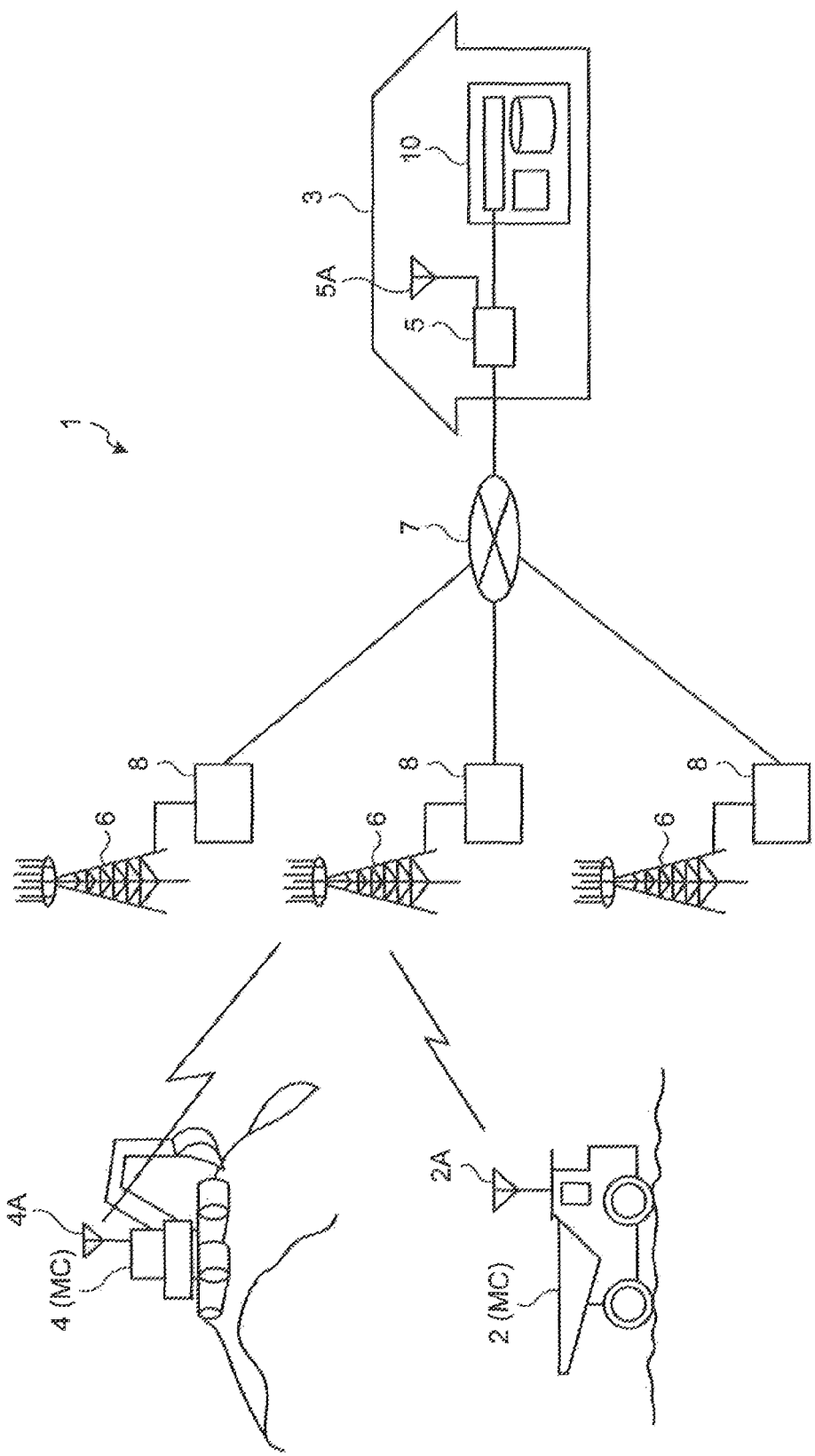
FIG. 1 is a diagram illustrating a site where a communication management system of a first embodiment is used.

FIG. 1 is a diagram illustrating a site where a communication management system 1 according to a first embodiment is used. The communication management system 1 detects abnormalities in a communications carrier (a telecommunications carrier) by monitoring communication states of mobile communications between work machines MC and a management device 10. Although a dump truck 2 and an excavator 4 are shown as the work machines in FIG. 1, the work machines MC are not limited to them in this embodiment. For example, the work machines may be wheel loaders, bulldozers, cranes, forklifts, and the like.

In this embodiment, the work machines MC are manned machines that are operated by operators, but the work machines MC are not limited to them. For example, each work machine MC may be an unmanned machine that is managed by the management device 10, performs operations such as traveling under the control of a control system or the like provided in the work machine MC, and has its operations managed by the management device 10 or is remotely operated by an operator via the management device 10.

The communication management system 1 includes the management device 10. The management device 10 collects operation information about the work machines MC via a mobile telephone network or the like (a mobile communication system) from the work machines MC, for example. The management device 10 is installed in a management facility 3, for example. In this embodiment, the management device 10 is connected to a communication link 7 via a communication device 5. The communication device 5 has an antenna 5A. Exchangers 8 are connected to the communication link 7. The exchangers 8 connect base stations 6 to the communication link 7. The exchangers 8 serve to relay communications between communication devices installed in the work machines MC and the management device 10 via the communication link 7. The base stations 6 receive and demodulate various kinds of information transmitted from the communication devices in the work machines MC, and transmits the demodulated information to the exchangers 8.

The work machines MC each include a control device that has a function to select and set one of communications carriers when performing a mobile communication. The work machines MC each transmit information about the communications carrier selected and set by the control device installed herein (hereinafter referred to as the communications carrier information, where appropriate) and the operation information about the work machine MC collected by the above described control device, to the outside from antennas 2A and 4A. The communications carrier information and the operation information do not need to be transmitted from the work machines MC to the outside at the same time. The information transmitted from the work machines MC is sent over the communication network of the communications carrier that has been set by the control devices of the work machines MC. The management device 10 acquires the information that has been transmitted from the communication devices of the work machines MC and includes the communications carrier information and the operation information, via the base stations 6, the exchangers 8, the communication link 7, and the communication device 5.

The operation information about the work machines MC is generated by the control devices of the work machines MC. The operation information is also transmitted to the management device 10. The operation information acquired by the management device 10 includes information about the operating states of the work machines MC, and is at least one of positional information (the coordinates of latitudes, longitudes, or altitudes) about positions of the work machines MC, operating times, traveling distances, engine water temperatures, existence/nonexistence of an abnormality, the site of the abnormality, the code representing the type of the abnormality, the states of battery voltages, remaining amounts of fuel, fuel consumption rates, load capacities, and the like. The operation information is to be used for preventive maintenance and fault diagnoses in the work machines MC, for example.

The management device 10 can transmit information to be given to the work machines MC. In this case, the management device 10 transmits the information to be given to the work machines MC to the communication link 7 via the communication device 5. This information is sent over the communication network of a communications carrier that has been set by the management device 10. The information to be given from the management device 10 to the work machines MC is modulated by the exchangers 8, and is transmitted in the form of radio waves from the base stations 6. The radio waves that are transmitted from the base stations 6 and contain the information to be given to the work machines MC and information about the communications carrier are received by the antennas 2A and 4A of the work machines MC. The communication devices of the work machines MC demodulate the radio waves received by the antennas 2A and 4A into the original information, and transmit the original information to control devices 20 of the work machines MC. In this manner, the work machines MC and the management device 10 can exchange information through wireless communications. Next, the management device 10 will be described in greater detail.

<Management Device 10>

Figure 2:
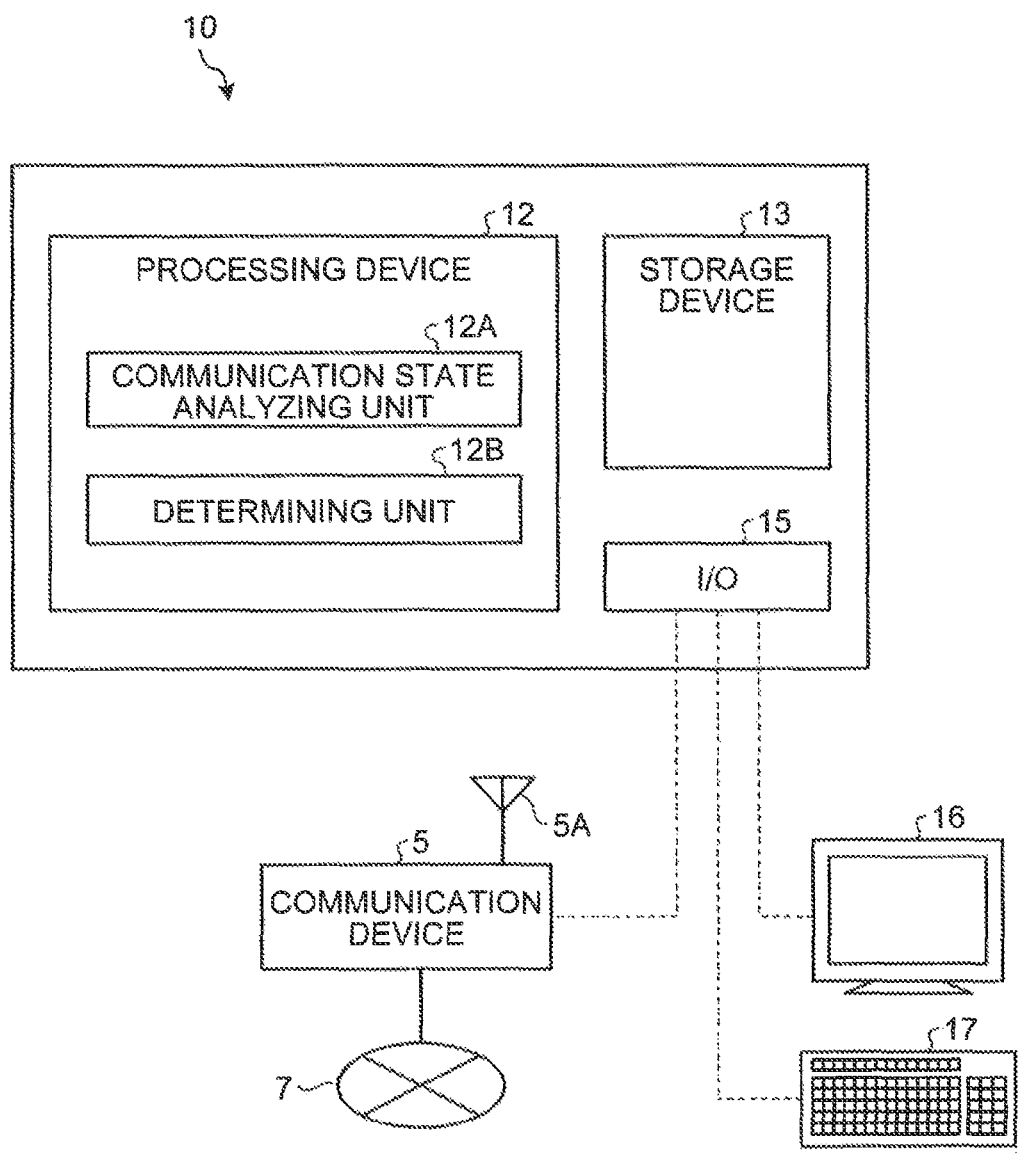
FIG. 2 is a diagram illustrating the management device in the communication management system.

FIG. 2 is a diagram illustrating the management device 10 included in the communication management system 1. The management device 10 includes a processing device 12, a storage device 13, and an input/output unit (I/O) 15. In the management device 10, a display device 16 as an output device, an input device 17, and the communication device 5 are connected to the input/output unit 15. The management device 10 is a computer, for example. The processing device 12 is a device formed by combining a CPU (Central Processing Unit) and a memory, for example. The storage device 13 is a RAM (Random Access Memory), a ROM (Read Only Memory), a flash memory, or a hard disk device, for example, or is a combination of them. The input/output unit 15 inputs/outputs information from/to the processing device 12 or the storage device 13. The input/output unit 15 inputs/outputs information from/to the display device 16 or the input device 17 connected to the management device 10, and further from/to the communication device 5.

The processing device 12 implements a work machine management method according to this embodiment. The processing device 12 includes a communication state analyzing unit 12A and a determining unit 12B. Although the work machine management method to be implemented by the communication state analyzing unit 12A and the determining unit 12B will be described later in detail, the functions of the communication state analyzing unit 12A and the determining unit 12B are now described below. The communication state analyzing unit 12A acquires communications carrier information transmitted from the communication units (the communication devices) of the work machines MC at different times, and, for each time, gathers statistics on the communications carrier information included at two or more different times. For example, the communication state analyzing unit 12A acquires communications carrier information from more than one work machine MC once a day, and, for each date of acquirement, gathers statistics on the communications carrier information acquired from the working carriers MC over two or more days.

For each communications carrier and for each date of carrier information acquirement from the work machines MC, the communication state analyzing unit 12A counts the number of times the communications carrier that can be used by the work machines MC has communicated with the work machines MC (the number of communications), for example. The number of communications is equivalent to the number of pieces of communications carrier information acquired by the communication state analyzing unit 12A (the number of data transmissions). The number of subject work machines MC may be one or larger. In a case where the number of subject work machines MC is two or larger, the work machines MC may be different kinds of work machines MC. The number of communications carriers that can be used by the work machines MC may be one or larger. The communication state analyzing unit 12A performs a process of arranging the communications carrier information in chronological order after the statistics gathering. Two or more pieces of communications carrier information arranged in chronological order will be hereinafter referred to as time-series data, where appropriate.

In this embodiment, the work machines MC can transmit positional information as the information about the positions thereof, as well as the communications carrier information, to the management device 10. In this case, the communication state analyzing unit 12A acquires the communications carrier information and the positional information from the communication units (the communication devices) of the work machines MC at different times, and, for each time, gathers statistics on the communications carrier information and the positional information included at two or more different times. For example, the communication state analyzing unit 12A acquires the communications carrier information and the positional information from two or more work machines MC once a day, and, for each date of acquirement, gathers statistics on the communications carrier information and the positional information acquired from the work machines MC over two or more days.

The determining unit 12B determines whether there is an abnormality in a communications carrier that can be used by the work machines MC. The determining unit 12B detects an abnormality from the number of pieces of communications carrier information acquired by the communication state analyzing unit 12A, or at least one of a change in the number of data transmissions over time and a change in the rate of communications carrier information between communications carriers over time. Examples of changes in the number of data transmissions over time include a decrease in the number of pieces of data on a specific communications carrier, and a rapid increase in the number of pieces of data on a specific communications carrier, for example.

The storage device 13 stores various kinds of computer programs for the processing device 12 to perform various kinds of processes. The storage device 13 also stores communications carrier information subjected to the statistics gathering by the communication state analyzing unit 12A.

The display device 16 is a liquid crystal display, for example. The input device 17 is a keyboard, a touch panel, or a mouse, for example. Next, the work machines MC are described in greater detail.

<Work machines MC>

Figure 3:
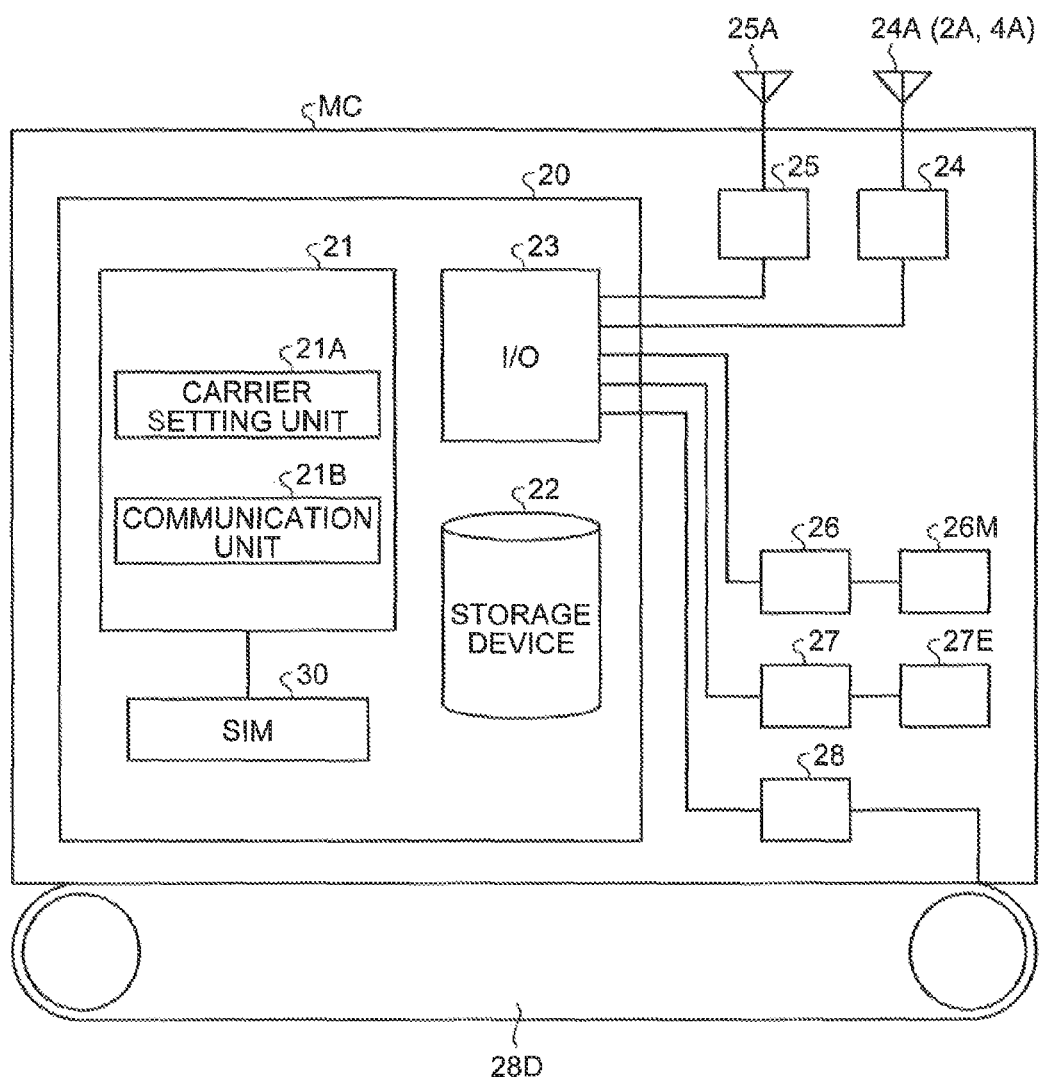
FIG. 3 is a diagram illustrating an example of a work machine.

FIG. 3 is a diagram illustrating an example of a work machine MC. The work machine MC includes a control device 20, a communication device 24 to which an antenna 24A is connected, a position detection device 25 to which a GPS antenna 25A is connected, an operating machine controller 26 that controls an operating machine 26M, an engine controller 27 that controls an engine 27E, and a travel controller 28 that controls a traveling device 28D. In a case where the work machine MC is the excavator 4, the travel controller 28 is not necessary. The work machine MC illustrated in FIG. 3 includes the operating machine 26M. The work machine MC is an excavator, a wheel loader, a bulldozer, a crane, or a forklift, for example, but is not limited to one that includes the operating machine 26M. The work machine MC may be a dump truck, for example. Although the work machine MC includes the engine 27E as the power generating source, the power generating source may be a motor.

The control device 20 includes a processing device 21, a storage device 22, and an input/output unit (I/O) 23. The control device 20 is a computer, for example. The control device 20 controls the work machine MC, and collects operation information. The control device 20 transmits the communications carrier information about the communications carriers that can be used by the work machine MC and the collected operation information to the outside of the work machine MC via the communication device 24 and the antenna 24A, or more specifically, to the management device 10 illustrated in FIGS. 1 and 2.

The operation information is information about the state of the operating machine 26M collected from the operating machine controller 26, information about the state of the engine 27E collected from the engine controller 27, and information about the state of the traveling device 28D collected from the travel controller 28 (information such as velocity and traveling direction). The information about the state of the operating machine 26M, the information about the state of the engine 27E, or the information about the state of the traveling device 28D includes information acquired from various kinds of sensors such as a pressure sensor, a rotation sensor, and a temperature sensor (not shown). The information acquired from various kinds of sensors may be the oil pressure of the engine oil, the speed of the engine 27E, the temperature of the cooling water or the operating oil of the engine 27E, or the like, but is not limited to them. The work machine MC can set the power of the engine 27E and set the velocity of the traveling device 28D with setting devices such as manual operation buttons (not shown). The control device 20 may collect the information about such settings, and incorporate the information into the operation information. Information about the position (the latitude, the longitude, or the altitude) of the work machine MC detected by the position detection device 25, and information about an abnormality that has occurred in the work machine MC are also included in the operation information. The information about an abnormality that has occurred in the work machine MC is an error code of some kind, or the type or the occurrence time of the abnormality, for example. The operation information may include not only the information about an abnormality that has occurred in the work machine MC, but also information such as an operating time indicating that the work machine MC is properly operating. The control device 20 collects the information about the position of the work machine MC (the positional information) and the information about the operating state of the work machine MC from the operating machine controller 26, the engine controller 27, the position detection device 25, the travel controller 28, and the various kinds of sensors of the work machine MC, to generate the operation information.

The processing device 21 is a device formed by combining a CPU and a memory, for example. The processing device 21 includes a carrier setting unit 21A and a communication unit 21B. A SIM (Subscriber Identity Module) card 30 is connected to the processing device 21. A SIM card is an IC card that stores information about a unique ID number or information about a communications carrier or the like. Information about communications carriers that cannot be used for communications by the work machine MC (communication-prohibited communications carriers) is stored beforehand in the SIM card 30. One or more pieces of information about the communications carriers that cannot be used for communications by the work machine MC are stored in the SIM card 30. The carrier setting unit 21A is installed in the work machine MC, and sets a communications carrier that provides communication services between the work machine MC and the management device 10. Radio waves unique to each communications carrier are transmitted from the base station 6 existing near the site where the work machine MC is operating. In a site where more than one communications carrier is used, ratio waves of the more than one communications carrier are transmitted from the base station 6. In this embodiment, the carrier setting unit 21A reads information stored in the SIM card 30 every time acquiring one or more radio waves unique to a communications carrier via the communication device 24. If a communications carrier identified from acquired radio waves unique to the communications carrier is not a communication-prohibited communications carrier stored in the SIM card 30, the communications carrier corresponding to the radio waves is set as the communications carrier that provides communication services between the work machine MC and the management device 10. The carrier setting unit 21A then generates the communications carrier information that is information indicating which communications carrier is the set communications carrier.

Information about communications carriers that can be used for communications by the work machine MC (communication-allowed communications carriers) may be stored beforehand in the SIM card 30. One or more pieces of information about the communications carriers that can be used for communications by the work machine MC are stored in the SIM card 30. In this case, if a communications carrier identified from radio waves that have been acquired from the base station 6 and are unique to the communications carrier is a communication-allowed communications carrier stored in the SIM card 30, the communications carrier corresponding to the radio waves may be set as the communications carrier that provides communication services between the work machine MC and the management device 10.

The communication unit 21B transmits the communications carrier information generated by the carrier setting unit 21A to the outside of the work machine MC from the communication device 24. In this case, the communication unit 21B transmits the communications carrier information by using the communications carrier set by the carrier setting unit 21A. Also, the communication unit 21B can transmit the operation information acquired by using the set communications carrier, and transmits the positional information detected by the position detection device 25, where necessary.

The storage device 22 is a RAM (Random Access Memory), a ROM (Read Only Memory), a flash memory, or a hard disk device, for example, or is a combination of them. The storage device 22 temporarily stores the communications carrier information generated by the carrier setting unit 21A, the operation information generated by the processing device 21, the positional information detected by the position detection device 25, and the like. The storage device 22 also stores the information that has been transmitted from the management device 10 and is to be given to the work machine MC as described above.

Further, the storage device 22 stores a computer program in which commands for processes to be performed by the processing device 21 are written, a computer program in which commands for the process of collecting the operation information are written, a computer program in which commands for controlling the work machine MC are written, various kinds of set values for operating the communication management system 1, and the like. The processing device 21 reads the above described computer programs, and performs the corresponding processes.

The input/output unit 23 is connected to the processing device 21, devices connected to the control device 20 such as the communication device 24, the position detection device 25, the operating machine controller 26, the engine controller 27, and the travel controller 28, and various kinds of sensors. The input/output unit 23 inputs/outputs information from/to the processing device 21, the devices connected thereto, and the sensors. The control device 20 and each of the controllers can communicate with each other by using a CAN (Controller Area Network), for example.

The communication device 24 is used when the control device 20 communicates with the outside of the work machine MC. In this embodiment, the communication device 24 is a wireless communication device. The communication device 24 includes various kinds of controllers, various kinds of sensors, a communication terminal, and a communication modem. The communication device 24 performs mutual wireless communications with the base stations 6 illustrated in FIG. 1 via the antenna 24A. The antenna 24A may be the antenna 2A of the dump truck 2 or the antenna 4A of the excavator 4 illustrated in FIG. 1. Alternatively, the antenna 24A may be other than those antennas. The control device 20 transmits and receives the above described operation information, the communications carrier information, the positional information, and the information to be given to the work machine MC, via the antenna 24A and the communication device 24.

The position detection device 25 is a position detecting unit that is mounted on the work machine MC, detects the position of the work machine MC, and generates the information about the detected position as the positional information. In this embodiment, the position detection device 25 has the GPS antenna 25A. The GPS antenna 25A receives radio waves that are output from GPS satellites constituting a GPS (Global Positioning System). The GPS antenna 25A outputs the received radio waves to the position detection device 25. The position detection device 25 converts the radio waves received by the GPS antenna 25A into electrical signals, and calculates the position of the position detection device 25 (positioning) to acquire the positional information about the work machine MC on which the position detection device 25 is mounted. The positional information is information about the position of the work machine MC, and is the coordinates of the latitude, the longitude, or the altitude. For the position detection device 25 to measure the position thereof, positioning satellites other than GPS satellites may be used. That is, position measurement is carried out by a GNSS (Global Navigation Satellite System). Next, the information to be transmitted from the work machine MC to the management device 10 is described.

<Information to be Transmitted by Work Machine MC>

Figure 4:
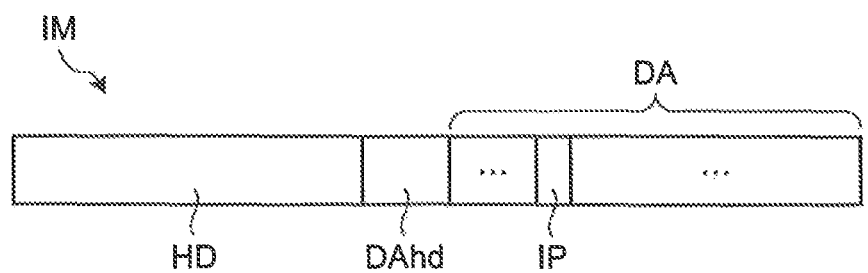
FIG. 4 is a diagram illustrating an example of information to be transmitted from a work machine to the management device.

FIG. 4 is a diagram illustrating an example of information to be transmitted from a work machine MC to the management device 10. In this embodiment, the control device 20 of the work machine MC transmits information to the management device 10 at predetermined times. The information to be transmitted from the work machine MC to the management device 10 is called work machine information IM. Information including the above described operation information is referred to as mobile information DA. In this embodiment, the work machine information IM includes the above mentioned mobile information DA, an operation information header portion DAhd, and a header portion HD.

The operation information header portion DAhd is attached to the top of the mobile information DA. The operation information header portion DAhd describes what kinds of information the mobile information DA is, which information is included in the mobile information DA, and the like. In this embodiment, the mobile information DA includes positional information IP.

The header portion HD of the work machine information IM is attached to the top of the operation information header portion DAhd. The header portion HD contains the identification information about the work machine MC, the time at which the work machine information IM was created, the time at which the work machine information IM was transmitted, communications carrier information, a base station code, radio field strength, a country code, an IP address, and the like. The identification information about the work machine MC is information for identifying the work machine MC, such as the telephone number of the communication device 24, the product serial number of the communication device 24, or the product serial number of the work machine MC.

Figure 5:
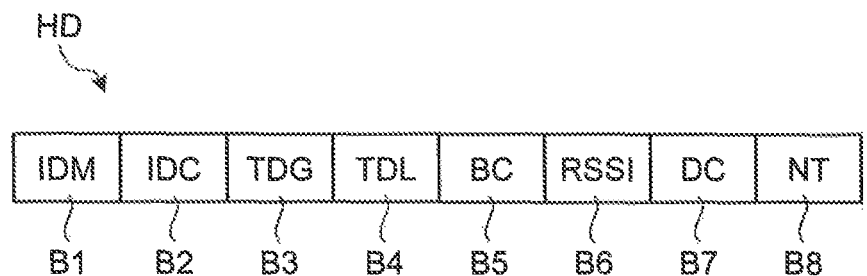
FIG. 5 is a diagram illustrating an example structure of a header portion.

FIG. 5 is a diagram illustrating an example of the structure of the header portion HD. The header portion HD includes eight regions B1, B2, B3, B4, B5, B6, B7, and B8 for storing information. In this embodiment, the identification information (the work machine identification information) IDM about the work machine MC is stored in the region B1, for example. The communications carrier that was used when the work machine information IM having the header portion HD attached thereto was transmitted is stored as the communications carrier information IDC in the region B2. The time (the generation time) TDG at which the work machine information IM was created is stored in the region B3. The time (the transmission time) TDL at which the work machine information IM was transmitted is stored in the region B4. The code (the base station code) BC of the base station 6 through which the work machine information IM having the header portion HD attached thereto was transmitted is stored in the region B5. Radio field strength RSSI is stored in the region B6. In the region B7, a country code DC is stored as information about the country where the work machine MC is operating. The telephone number NT assigned to the communication device 24 illustrated in FIG. 3 is stored in the region B8. As described above, the header portion HD contains the communications carrier information IDC. Accordingly, by analyzing the header portion HD, the management device 10 can identify the communications carrier that was used when the work machine information IM having the header portion HD attached thereto was transmitted.

Figures 6, 7:
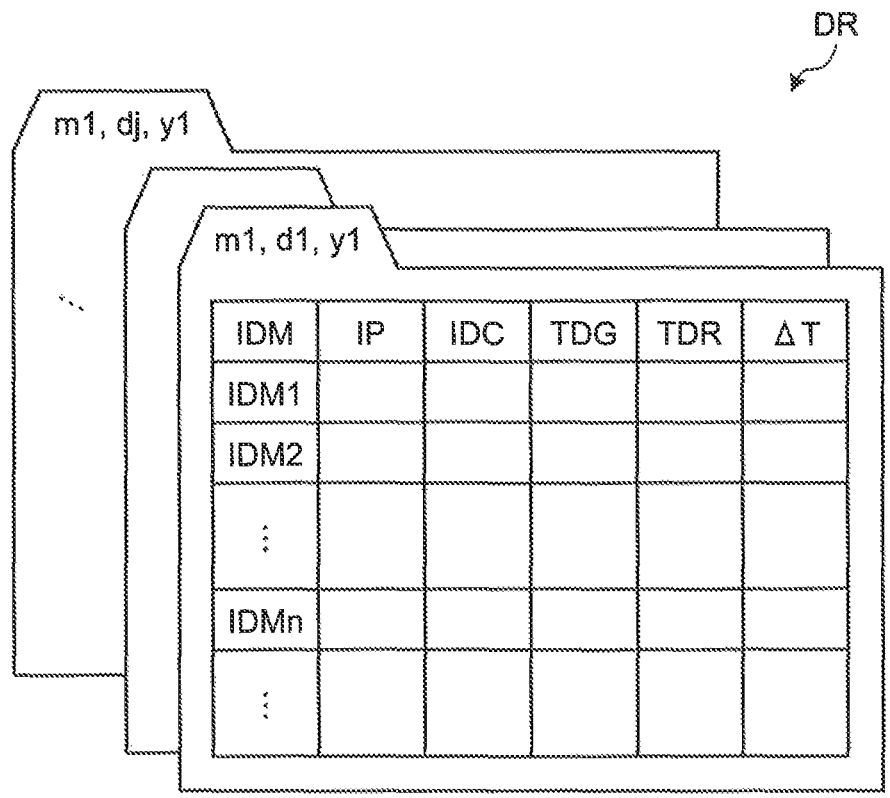
FIG. 6 is a diagram illustrating an example of communication information lists generated by the management device.
FIG. 7 is a diagram illustrating an example of time-series data generated by arranging, in chronological order, communications carrier information acquired by the management device in a predetermined period of time.

FIG. 6 is a diagram illustrating an example of communication information lists generated by the management device 10. The management device 10 creates communication information lists DR as shown in FIG. 6, for example, from the information stored in the header portion HD of received work machine information IM. The communication information lists DR are stored into the storage device 13. The communication state analyzing unit 12A of the management device 10 creates the communication information lists DR. For example, a communication information list DR is created every time the work machine information IM is acquired. That is, the management device 10 creates the communication information lists DR from the work machine information IM included at times at which the work machine information IM was acquired. For example, in a case where the management device 10 acquires the work machine information IM once a day, a communication information list DR is created from the work machine information IM acquired on the day. The communication devices 24 and the like of the work machines MC may be set so that the management device 10 can acquire the work machine information IM twice or more a day, and each communication information list DR may be created from two or more pieces of work machine information IM. Alternatively, in a case where the management device 10 acquires the work machine information IM once a day, a communication information list DR may be created from the work machine information IM of a predetermined period such as one week.

In the communication information lists DR, the positional information IP, the communications carrier information IDC, the generation time TDG, an arrival time TDR, and the period of time ΔT required for the arrival are written with respect to one or more pieces of work machine identification information IDM for each time at which the management device 10 acquires work machine information IM. The arrival time TDR is equivalent to the time at which the work machine information IM reached the management device 10, or the time at which the management device 10 received the work machine information IM. The work machine information IM includes the communications carrier information IDC in its header portion HD, and therefore, the arrival time TDR is the time at which the communications carrier information IDC was acquired by the management device. The period of time ΔT required for the arrival is determined from the difference between the arrival time TDR and the transmission time TDL.

In the communication information lists DR in this example, the positional information IP, the communications carrier information IDC, the generation times TDG, the arrival times TDR, and the periods of time ΔT required for the arrivals, which correspond to pieces of work machine identification information IDM1, IDM2, . . . , and IDMn, are written. In the communication information lists DR, pieces of information corresponding to the times at which the management device 10 acquired the work machine information IM are also written. In this example, information about days d1 through dj in month m1, year y1, is included in the communication information lists DR (j being an integer of 1 to 31). A manager or the like who has accessed the management device 10 and seen the communication information lists DR can recognize the communications carriers used for communications of the work machine information IM transmitted from the work machines MC, and the number of the communications (equivalent to the number of data transmissions) from the communications carrier information IDC included in the communication information lists DR. In this manner, the communication state analyzing unit 12A of the management device 10 acquires the communications carrier information IDC transmitted from the communication devices 24 as the communication units of the work machines MC at different times, and, for each time, gathers statistics on the communications carrier information IDC included at two or more different times. The statistics gathering may not be realized in the form of the communication information lists DR. Also, the statistics gathering may be performed at least once a day, or may be performed at least once in a predetermined period such as one week as described above. Statistics on the communications carrier information IDC may be gathered once in a minimum unit time.

Further, in this embodiment, statistics on the communications carrier information IDC included at two or more different times are gathered for each of the times, and the management device 10 may acquire, at different times, the communications carrier information IDC to be subjected to statistics gathering. In other words, among pieces of communications carrier information IDC acquired by the management device 10 at the same time, statistics on the communications carrier information IDC included at two or more different times may be gathered. Statistics on the positional information IP are gathered in the same manner as with the communications carrier information IDC.

FIG. 7 is a diagram illustrating an example of time-series data generated by arranging, in chronological order, the communications carrier information IDC acquired by the management device 10 in a predetermined period of time. Three kinds of communications carrier information are included in FIG. 7. The respective communications carrier names a, b, and c are used as the respective pieces of communications carrier information IDC (the same will apply hereafter). The information about n (n being an integer of 1 or greater) work machines MC is also included in FIG. 7. The respective work machines MC are distinguished by the pieces of the work machine identification information IDM1, IDM2, . . . , and IDMn. In FIG. 7, the communications carrier information IDC included in the work machine information IM acquired by the management device 10 in the predetermined period of days d1 through dj is written. A smaller number after "d" indicates older information.

The work machines MC identified by the pieces of the work machine identification information IDM1 through IDMn transmit the work machine information IM to the management device 10 by using the communications carrier a until day d2. On day d3, each of the work machines MC identified by the pieces of the work machine identification information IDM1 through IDMn transmits the work machine information IM to the management device 10 by using the communications carrier b or c. Accordingly, it is clear that the communications carrier a is not used for communications from the work machines MC to the management device 10 on day d3. From this result, the determining unit 12B of the management device 10 or the manager can determine that an abnormality disabling communications has occurred in the communications carrier a on day d3.

Figure 8:
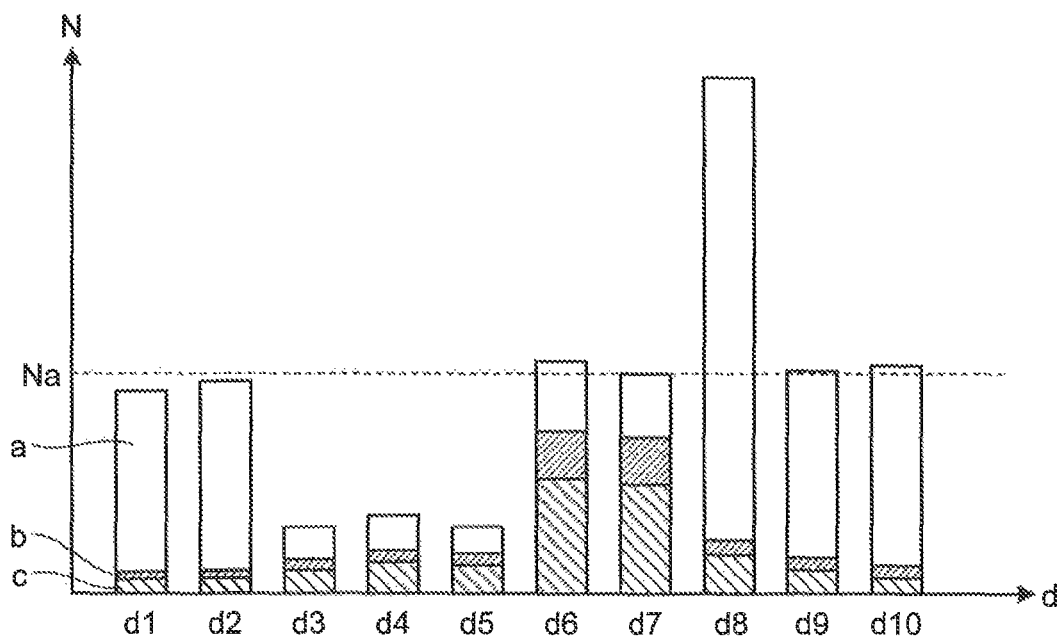
FIG. 8 is a diagram illustrating an example of the numbers of pieces of communications carrier information counted for each day and arranged in chronological order.
Figure 9:
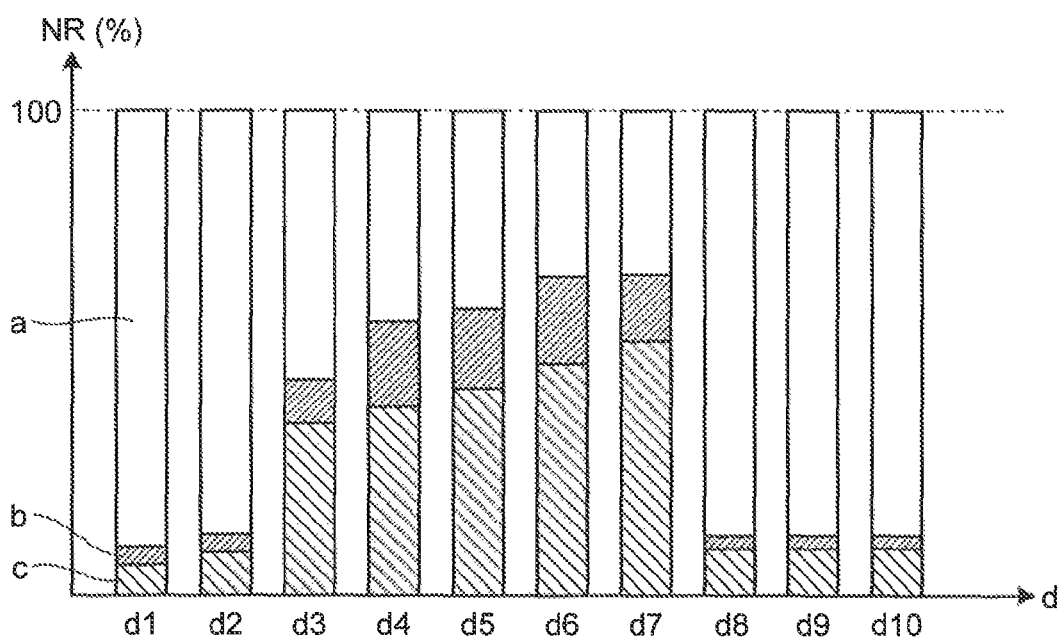
FIG. 9 is a diagram illustrating an example of the rates of communications carrier information about communications carriers calculated for each day and arranged in chronological order.

FIG. 8 is a diagram illustrating an example of N pieces of communications carrier information IDC that have been subjected to statistics gathering once a day and been arranged in chronological order. FIG. 9 is a diagram illustrating an example of rates NR of communications carrier information IDC about the communications carriers that have been subjected to statistics gathering once a day and been arranged in chronological order. FIGS. 8 and 9 each illustrate an example of time-series data. Such time-series data is created by the management device 10, or more specifically, by the communication state analyzing unit 12A. The management device 10 may cause the display device 16 illustrated in FIG. 2 to display the time-series data, or may cause a printer as the output device to output the time-series data. In this manner, the manager can visually recognize the time-series data. In displaying and outputting the time-series data, statistics on the communications carrier information IDC may not be gathered daily as in FIGS. 8 and 9. Statistics on the communications carrier information IDC may be gathered once in a predetermined period such as one week that is set as a minimum unit time as described above.

The ordinate axis in FIG. 8 indicates the number N of pieces of the communications carrier information IDC, which is also referred to as the number N of data transmissions where appropriate. The ordinate axis in FIG. 9 indicates the rates NR of the communications carrier information IDC about the communications carriers, which are also referred to as the usage rates NR where appropriate. The abscissa axis in each of FIGS. 8 and 9 indicates the days on which the management device 10 acquired the communications carrier information IDC. The respective days are distinguished by the numbers following the sign "d". A greater number indicates newer information. FIGS. 8 and 9 illustrate the results of statistics gathering performed on the communications carrier information IDC over the ten days of days d1 through d10.

As can be seen from FIGS. 8 and 9, there is a large difference in the state of the communications carrier information IDC between day d2 and day d3. Specifically, it is apparent from FIG. 8 that the total number of the numbers N of data transmissions is close to Na until day d2 but dramatically decreases on day d3, and, on day d3, the number N of data transmissions of the communications carrier a dramatically decreases while the number N of data transmissions of each of the communications carriers b and c increases. It is apparent from FIG. 9 that the usage rate NR of the communications carrier a becomes lower on day d3 than on day d2, and the usage rates NR of the communications carriers b and c become higher on day d3 than on day d2. From this result, the determining unit 12B of the management device 10 or the manager can determine that an abnormality disabling communications occurred in the communications carrier a on day d3. Since an abnormality occurred in the communications carrier a, the usage rates NR of the communications carriers b and c became higher.

From day d3 to day d7, the usage rate NR of the communications carrier a is lower than on day d2 and earlier, and is lower than the usage rates NR of the communications carriers b and c on day d4 and later. During this period, the number N of data transmissions of the communications carrier a is smaller than the number N of communications of each of the communications carriers b and c, compared with the numbers on day d2 and earlier. From this result, the determining unit 12B of the management device 10 or the manager can determine that the abnormality in the communications carrier a remained at least until day d7.

As can be seen from FIG. 8, the total number of the numbers N of data transmissions was close to Na on day d2 and earlier when there was no abnormality in the communications carrier a, but dramatically increased on day d8. Also, as can be seen from a result of an analysis of the increase in the total number of the numbers N of data transmissions, the increase concentrates on the communications carrier a. As can be seen from FIG. 9, the usage rates NR on day d8 are substantially the same as the usage rates NR on day d2 and earlier when there was no abnormality in the communications carrier a. The usage rates NR on day d9 and later are also substantially the same as the usage rates NR on day d2 and earlier when there was no abnormalities in the communications carrier a. From those results, the determining unit 12B of the management device 10 or the manager can determine that the abnormality in the communications carrier a was solved on day d8. The increase in the total number of the numbers N of data transmissions on day d8 was caused, as the work machine information IM including the communications carrier information IDC, which was accumulated in the server of the communications carrier a and had not been transmitted to the management device 10 during the period of day d3 to day d7 when there was an abnormality in the communications carrier a, was collectively transmitted to the management device 10 on day d8.

As described above, the determining unit 12B of the management device 10 or the manager can determine that an abnormality has occurred in the communications carrier a, b, or c, or that the communications carriers a, b, and c are in a normal state, by using time-series data of the communications carrier information IDC. In doing so, the determining unit 12B of the management device 10 or the manager can more accurately detect an abnormality in a communications carrier by using the number of the pieces of communications carrier information IDC acquired by the communication state analyzing unit 12A, or at least one of a change over time in the numbers N of data transmissions, and a change over time in the usage rates NR that are the communications carrier information ratios among the communications carriers a, b, and c.

Although there are more than one work machine MC and more than one communications carrier in the above described example, the determining unit 12B of the management device 10 or the manager can determine whether an abnormality has occurred in a communications carrier by using time-series data, regardless of the number of the work machines MC and the number of communications carriers. For example, even if there is only one work machine MC, the determining unit 12B of the management device 10 or the manager can determine that an abnormality of some kind has occurred in a communications carrier that has a decreasing usage rate NR when there is a large change in the usage rate NR calculated from the communications carrier information IDC. In a case where there is only one communications carrier, the communications carrier information IDC is not acquired from the work machine MC using the communications carrier when there is an abnormality in the communications carrier. Accordingly, the determining unit 12B of the management device 10 or the manager can detect the abnormality in the communications carrier from a rapid decrease in the number N of data transmissions.

Figure 10:
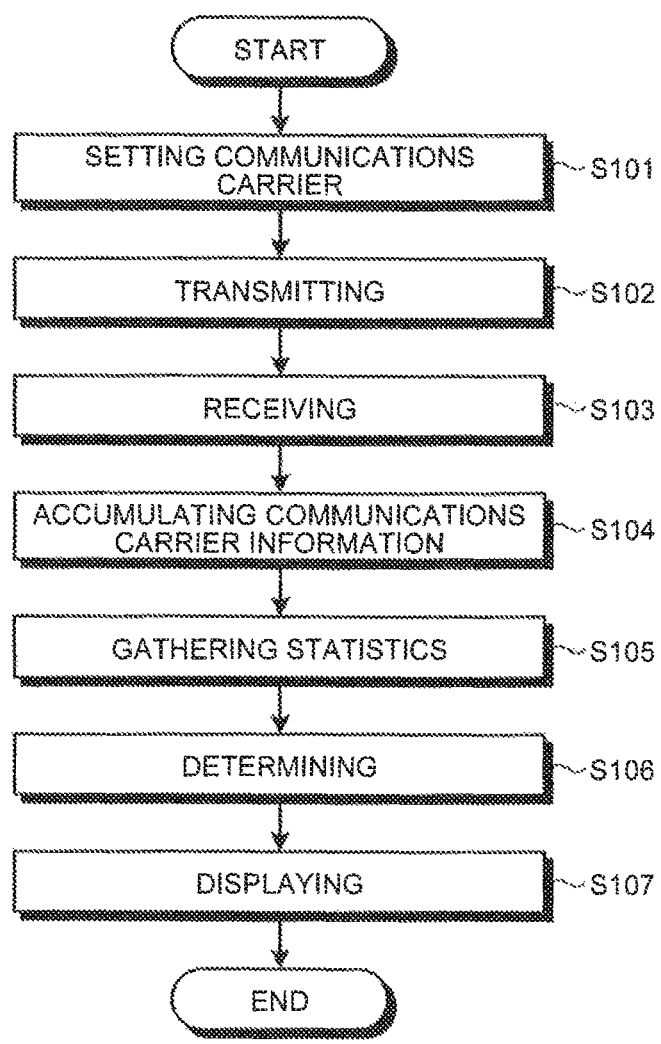
FIG. 10 is a flowchart illustrating an example process according to a communication management method of the first embodiment.

FIG. 10 is a flowchart showing an example process according to a communication management method of the first embodiment. The communication management method of this embodiment is implemented by the communication management system 1. In step S101, the carrier setting unit 21A of the work machine MC illustrated in FIG. 3 sets a communications carrier to be used for communications, and generates communications carrier information IDC. In step S102, the communication unit 21B transmits the communications carrier information IDC to the outside via the communication device 24. Although the communications carrier information IDC is included in the work machine information IM at the time of transmission in this embodiment, the communication unit 21B may transmit the communications carrier information IDC independently of the other information. Steps S101 and S102 are procedures that are carried out by the control device 20 of the work machine MC.

The communications carrier information IDC transmitted from the work machine MC is transmitted to the management device 10 through the communications carrier that has been set by the carrier setting unit 21A. At this point, the communications carrier information IDC is transmitted to the management device 10 via the server or the like of the set communications carrier. As the communications carrier information IDC is temporarily stored in the server of the communications carrier, the communications carrier information IDC is stored in the server for a predetermined period of time even if an abnormality later occurs in the set communications carrier. After the communication abnormality is solved, the communications carrier information IDC stored in the server is transmitted from the server to the management device 10.

In step S103, the management device 10 receives and acquires the communications carrier information IDC via the communication network of the set communications carrier. At this point, the management device 10 receives the communications carrier information IDC at a predetermined time. Although the predetermined time comes once a day in this embodiment, the predetermined time is not limited to that. For example, the predetermined time comes twice or more a day, once in a few days, or once a week. In this embodiment, the management device 10 acquires the communications carrier information IDC at different predetermined times.

In step S104, the management device 10 stores and accumulates the acquired communications carrier information IDC into the storage device 13. In step S105, for each time, the communication state analyzing unit 12A of the management device 10 gathers statistics on the communications carrier information IDC included at two or more different times, and generates time-series data if necessary. The statistics are gathered in the above described manner, and the time-series data are generated in the above described manner. The management device 10 may cause the display device 16 illustrated in FIG. 2 to display the time-series data, for example. Alternatively, the management device 10 may transfer the time-series data to a mobile terminal device or the like including a display function through a wireless communication, and cause the mobile terminal device or the like to display the time-series data.

In step S106, the determining unit 12B of the management device 10 determines whether there is an abnormality in the communications carrier from the time-series data. The determination is performed in the above described manner. In step S107, the management device 10 causes the display device 16 illustrated in FIG. 2 to display a determination result, for example. At this point, the management device 10 may report that an abnormality has occurred through a sound or an image or the like displayed on the display device 16, and may report the communications carrier having the abnormality through a sound or an image or the like. With this arrangement, the manager can easily notice the abnormality in the communications carrier.

Although one communications carrier is selected and set between a work machine MC and the management device 10 in this embodiment as described above, this embodiment is not limited to that. In a case where the country in which a work machine MC is operating differs from the country in which the management device 10 is installed, for example, there are two communications carriers existing between the work machine MC and the management device 10: one is a communications carrier of the country in which the work machine MC is operating and the country in which the management device 10 is installed, and the other one is a communications carrier of the country in which the management device 10 is installed. In such a case, the work machine MC transmits the communications carrier information IDC about the communications carrier of the country in which the work machine MC is operating, to the management device 10. As a result, the management device 10 or the manager can determine whether there is an abnormality in the communications carrier of the country in which the work machine MC is operating.

As described above, in this embodiment, the communications carrier information IDC from the work machines MC is acquired at different times, and statistics on the communications carrier information IDC included at two or more different times are gathered for each of the times. Accordingly, at each time of acquirement of the communications carrier information IDC, at least either the numbers N of data transmissions or the usage rates NR determined based on the communications carrier information IDC can be acquired in this embodiment. Since at least either the numbers N of data transmissions or the usage rates NR based on the communications carrier information IDC are acquired in this embodiment, the acquired numbers or rates are compared so as to determine whether an abnormality has occurred in a communications carrier, or determine and identify which communications carrier has an abnormality, for example. Also, in this embodiment, the communications carrier information IDC transmitted from work machines is used, so that an abnormality in a communications carrier can be searched for once in a time period equivalent to the time intervals at which the communications carrier information IDC is acquired, such as once a day. Accordingly, in this embodiment, an abnormality in a communications carrier is promptly found and is reported to the communications carrier having the abnormality, so that a quick recovery can be facilitated. The configuration of this embodiment can be applied to the embodiment described below, where appropriate, and omissions, replacements, or modifications can also be made in the configuration of this embodiment.

Second Embodiment

In a second embodiment, communications carrier information IDC and positional information IP transmitted from work machines MC are acquired at different times, and, for each of the times, the communications carrier information IDC and the positional information IP included at two or more different times are associated with each other. In other words, the second embodiment uses the same communication management system and the same communication management method as those of the first embodiment, but differs from the first embodiment in using the positional information IP about the work machines MC as well as the communications carrier information IDC.

Figures 11, 12:
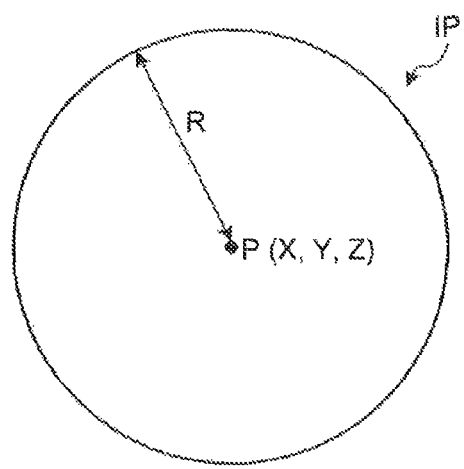
FIG. 11 is a diagram illustrating an example of time-series data generated by associating communications carrier information with positional information IP acquired by a management device in a predetermined period of time, and arranging the communications carrier information and the positional information IP in chronological order.
FIG. 12 is a diagram for explaining positional information.

FIG. 11 is a diagram illustrating an example of time-series data formed with communications carrier information IDC and positional information IP that have been acquired by the management device 10 in a predetermined period of time, been associated with each other, and been arranged in chronological order. FIG. 11 includes the positional information IP about work machines MC, as well as the above described time-series data of the communications carrier information IDC shown in FIG. 7. The positional information IP is represented by P1, P2, . . . , and Pn (n being an integer of 1 or greater). The number of pieces of the positional information IP is the same as the number of pieces of work machine information IM. Since the information about n (n being an integer of 1 or greater) work machines MC is included in FIG. 11, the number of the pieces of the positional information IP and the number of the pieces of the communications carrier information IDC included on each of days d1, d2, . . . , and dj are also n. A smaller number after "d" indicates older information.

FIG. 12 is a diagram for explaining the positional information IP. The positional information IP indicates a position of the work machine MC detected by the position detection device 25 of the work machine MC illustrated in FIG. 3. Where X represents longitude, Y represents latitude, and Z represents altitude, the positional information IP can be expressed by the coordinates P (X, Y, Z). In this embodiment, communications carrier information IDC and positional information IP that are acquired at two or more different times and are included at each of the times are associated with each other to form a set of information, and the same sets of information acquired at two or more different times are compared, for example.

Where the positional information IP is expressed with by the coordinates P (X, Y, Z), there is a possibility that the position of the work machine MC is determined to have varied if there is even a slight difference in the coordinates P (X, Y, Z) between different times. In this embodiment, an area in which an abnormality has occurred is identified based on the positional information IP. If the position of the work machine MC is determined to have varied when there is even a slight difference in the coordinates P (X, Y, Z), many pieces of positional information IP are obtained. As a result, there is a possibility that identifying the area in which an abnormality has occurred in a specific communications carrier will become complicated. Also, as will be described later, in a case where the management device 10 displays the communications carrier information IDC on a map based on the positional information IP, there is a possibility that many pieces of the communications carrier information IDC will be displayed on the map and it will become difficult to visually recognize the communications carrier information IDC, if the position of the work machine MC is determined to have varied when there is even a slight difference in the coordinates P (X, Y, Z).

In this embodiment, when the currently-acquired positional information IP is located within a predetermined radius R from the previously-acquired coordinates P (X, Y, Z) of the work machine MC, the management device 10 may regard the currently-acquired position as the same position as the previously-acquired one. In this manner, the number of pieces of the positional information IP can be restricted to a reasonable number, and accordingly, identifying the area in which an abnormality has occurred in a specific communications carrier becomes easier. Also, when the management device 10 displays the communications carrier information IDC on the map based on the positional information IP, display of an excessive number of pieces of the communications carrier information IDC on the map can be prevented.

As can be seen from the time-series data shown in FIG. 11, the work machines MC identified by the work machine identification information IDM1 through IDMn each transmit the work machine information IM to the management device 10 by using the communications carrier a on day d1. On day d2, the work machines MC identified by the work machine identification information IDM through IDMn each transmit the work machine information IM to the management device 10 by using the communications carrier b or c. That is, on day d2, the communications carrier a is not used for communications of the work machine information IM and the like from the work machines MC to the management device 10. From this result, the determining unit 12B of the management device 10 or the manager can determine that an abnormality of some kind disabling communications has occurred in the communications carrier a on day d2.

In this embodiment, the communications carrier information IDC and the positional information IP are associated with each other. Accordingly, the determining unit 12B of the management device 10 or the manager can recognize the area with an abnormality from the positional information IP, as well as the communications carrier having the abnormality. In this embodiment, an abnormality in a communications carrier and the area in which the abnormality has occurred are promptly found and are reported to the communications carrier having the abnormality, so that an even quicker recovery can be facilitated.

<Map Display>

Figure 13:
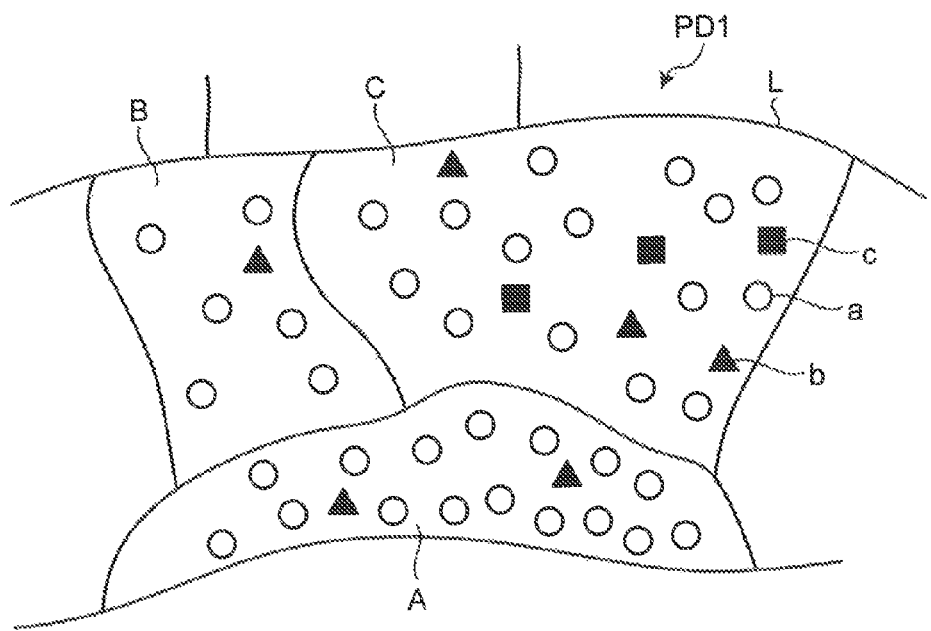
FIG. 13 is a diagram illustrating an example of communications carrier information displayed on a map.
Figure 14:
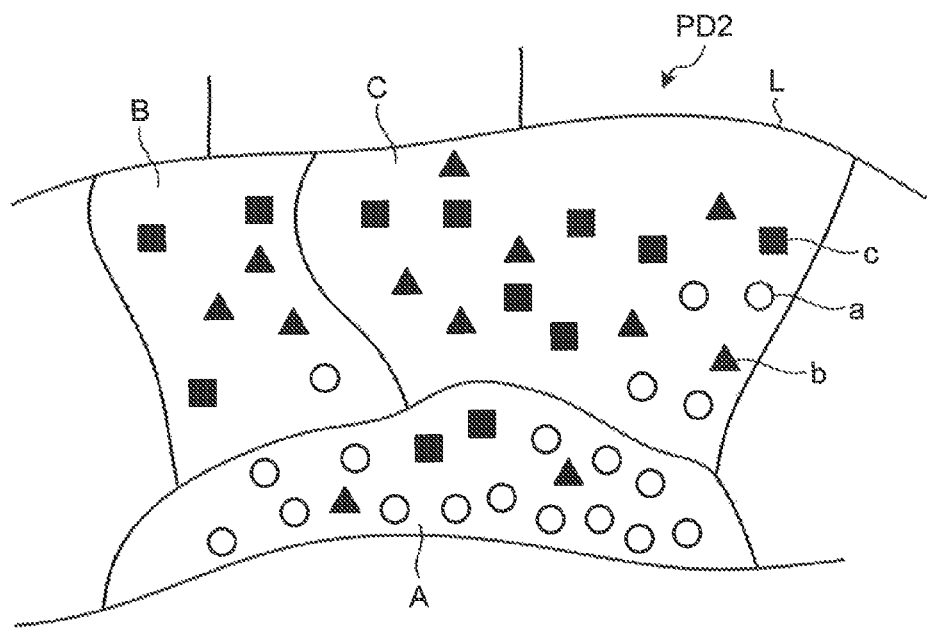
FIG. 14 is a diagram illustrating an example of communications carrier information displayed on a map.

FIGS. 13 and 14 are diagrams illustrating examples of communications carrier information IDC displayed on maps PD1 and PD2. FIG. 13 illustrates the situation on day d1 shown in FIG. 11. FIG. 14 illustrates the situation on day d2 shown in FIG. 11. That is, the map PD1 and the map PD2 are time-series data. The maps PD1 and PD2 are displayed on the display device 16 by the management device 10 illustrated in FIG. 2, for example. The maps PD1 and PD2 may be displayed next to each other on the same screen of the display device 16, or may be displayed on the display device 16 at different times by the management device 10 or the manager switching screens on the display device 16. Alternatively, the maps PD1 and PD2 may be displayed on a recording medium by a printer printing out the maps PD1 and PD2 on the recording medium such as paper.

The management device 10 causes the display device 16 or the like to display symbols indicating the positions of the work machines MC in the positions on the maps PD1 and PD2 according to the positional information IP included in the work machine information IM transmitted from the work machines MC. Based on the positional information IP about the work machines MC and the communications carrier information IDC, the management device 10 distinguishes the communications carriers a, b, and c used by the work machines MC with the types of the symbols, and causes the display device 16 or the like to display the communications carriers a, b, and c. That is, the communications carrier information IDC is displayed on the maps PD1 and PD2. The symbols displayed on the maps PD1 and PD2 represent the positions of the work machines MC and the communications carriers used by the work machines MC.

The solid lines L shown in the maps PD1 and PD2 illustrated in FIGS. 13 and 14 are the lines that separate areas (separator lines). The separated areas may be administrative areas, or may be areas in accordance with original management sections that have been set in advance. In an area where different countries are located adjacent to one another, the solid lines L shown in the maps PD1 and PD2 may be national borders. The areas surrounded by the solid lines L are set as an area A, an area B, and an area C as shown in FIGS. 13 and 14, for example. The states of the communications carriers of the areas adjacent to one another as shown in FIGS. 13 and 14 are managed, but the respective areas may be at a distance from one another. For example, original management sections may be set beforehand as follows: the area A as an airport construction site, the area B as a roadwork site at a distance from the area A, and the area C as a dam construction site that is at a distance from the area A but is adjacent to the area B.

As can be seen from FIGS. 13 and 14, on day d1 and day d2, the communications carrier a is used in most of the regions in the area A. In the areas B and C, there are differences in the used communications carriers between day d1 and day d2. Specifically, in the areas B and C, the usage of the communications carrier a decreases on day d2 compared with day d1, and the usage of the communications carriers b and c increases on day d2 compared with day d1. In the area A, the communications carrier being used is changing from the communications carrier a to the communications carrier c on day d2 in the regions close to the borders with the area B and the area C.

From this result, the determining unit 12B of the management device 10 or the manager can determine that an abnormality has occurred in the communications carrier a between day d1 and day d2, and the areas in which the abnormality has occurred include the areas B and C, and the regions adjacent to the areas B and C in the area A. As described above, in this embodiment, the positional information IP about the work machines MC and the communications carrier information IDC are displayed on a map, so that the determining unit 12B of the management device 10 or the manager can detect the existence or nonexistence of an abnormality in a communications carrier, and identify the time at which the abnormality has occurred and the place where the abnormality has occurred, such as which communications carrier has an abnormality, when the abnormality has occurred, and in which area the abnormality has occurred.

Figure 15:
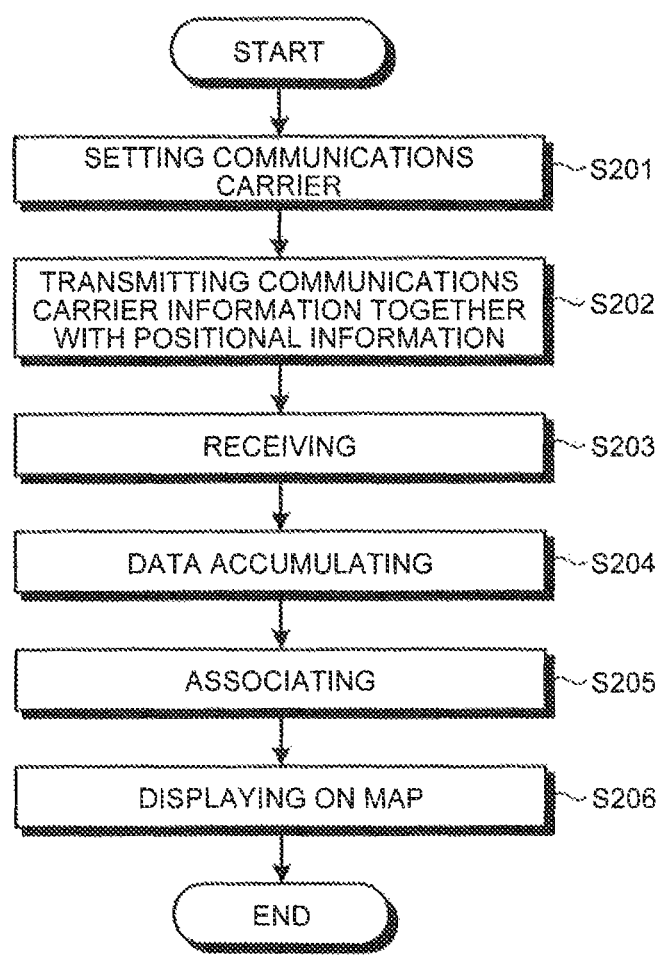
FIG. 15 is a flowchart illustrating an example process according to a communication management method of a second embodiment.

FIG. 15 is a flowchart showing an example process according to a communication management method of the second embodiment. The communication management method of this embodiment is implemented by the communication management system 1 illustrated in FIG. 1. In step S201, the carrier setting unit 21A of the work machine MC illustrated in FIG. 3 sets a communications carrier to be used for communications, and generates the communications carrier information IDC. In step S202, the communication unit 21B transmits the position of the work machine MC detected by the position detection device 25 as the positional information IP, as well as the communications carrier information IDC, via the communication device 24. The positional information IP can be the positional information IP detected at the time of transmission of the communications carrier information iDC, for example. Steps S201 and S202 are the procedures that are carried out by the control device 20 of the work machine MC.

In step S203, the management device 10 receives and acquires the communications carrier information IDC and the positional information IP from the work machine MC via the communication network of the communications carrier that has been set by the work machine MC. At this point, the management device 10 receives the communications carrier information IDC and the positional information IP at predetermined times. In this embodiment, the management device 10 acquires the communications carrier information IDC and the positional information IP at different predetermined times. In step S204, the management device 10 stores and accumulates the acquired communications carrier information IDC and positional information into the storage device 13.

In step S205, the communication state analyzing unit 12A of the management device 10 performs, for each time, a process of associating the communications carrier information IDC and the positional information IP included at two or more different times with each other, and generates time-series data if necessary. The communications carrier information IDC and the positional information IP associated with each other for each of the different times are one set of information including the communications carrier information IDC and the positional information IP on each of days d1, d2, and the like in the time-sires data shown in FIG. 11, for example.

In step S206, the management device 10 causes the display device 16 to display the communications carrier information IDC associated with the positional information IP in the positions on the map according to the positional information IP about the work machine MC. In this embodiment, the determining unit 12B of the management device 10 may determine whether there is an abnormality in a communications carrier and which area has the abnormality from the time-series data shown in FIG. 11, for example. As a result of the determination, the management device 10 may report which communications carrier has an abnormality and the area with the abnormality through a sound or an image or the like displayed on the display device 16, or may report a communications carrier having an abnormality and the area with the abnormality through a sound or an image or the like. With this arrangement, the manager can easily recognize an abnormality in a communications carrier and the area in which the abnormality has occurred. Also, an abnormality in a communications carrier and the area in which the abnormality has occurred may be displayed in the form of text information, instead of the above described maps, on the display device 16. For example, a text such as "There may have been an abnormality in the communications carrier a since day d2 in the area A" may be used in reporting.

As described above, in this embodiment, the communications carrier information IDC from a work machine MC is acquired at different times, and, for each of the times, the communications carrier information IDC and the positional information IP included at two or more different times are associated with each other and are then subjected to statistics gathering. In this embodiment, the communications carrier information IDC and the positional information IP associated with the communications carrier information IDC are acquired in chronological order at two or more different times. By comparing those pieces of information, it is possible to determine which communications carrier has an abnormality, when the abnormality has occurred, and identifies the area in which the abnormality has occurred. Accordingly, in this embodiment, an abnormality in a communications carrier and the area in which the abnormality has occurred are promptly detected, and are reported to the communications carrier having the abnormality, so that an even quicker recovery can be facilitated.

The first embodiment and the second embodiment have been described so far, and the components described in those embodiments include components obvious to a person skilled in the art and components substantially the same as the above described components or so-called equivalents. The above described components can be combined in any appropriate manner. Furthermore, various omissions, replacements, or modifications may be made among the components without departing from the scope of the embodiments.

REFERENCE SIGNS LIST 1 communication management system
3 management facility
5 communication device
6 base station
7 communication link
8 exchanger
10 management device
12 processing device
12A communication state analyzing unit
12B determining unit
13 storage device
15 input/output unit
16 display device
17 input device
20 control device
21 processing device
21A carrier setting unit
21B communication unit
22 storage device
23 input/output unit
24 communication device
25 position detection device
30 SIM card
IDC communications carrier information
IDM work machine identification information
IM work machine information
IP positional information
MC work machine
N number of data transmissions
NR usage rate
PD1, PD2 map
L separator line

The invention claimed is:

1. A communication management system in which a work machine communicates with an outside of the work machine, the communication management system comprising:
a work machine including: a communications carrier setting unit configured to set a communications carrier that provides a communication service to generate information about the set communications carrier as communications carrier information; and a communication unit configured to transmit the communications carrier information to the outside of the work machine;
a communication state analyzing unit configured to gather statistics on the communications carrier information included at two or more different times among pieces of the communications carrier information transmitted from the communication unit, the statistics gathering being performed for each of the times; and
a determining unit configured to determine whether an abnormality occurs in the communications carrier, from at least one of a change over time in the number of the pieces of the communications carrier information acquired by the communication state analyzing unit and a change over time in a rate of the communications carrier information among a plurality of the communications carriers.

2. The communication management system of claim 1, wherein the communication state analyzing unit generates time-series data by arranging the communications carrier information in chronological order after the statistics gathering.

3. A communication management system in which a work machine communicates with an outside of the work machine, the communication management system comprising:
a communications carrier setting unit configured to set a communications carrier that provides a communication service to generate information about the set communications carrier as communications carrier information, the communications carrier setting unit being mounted on the work machine;
a position detecting unit configured to detect a position of the work machine and generate information about the detected position as positional information, the position detecting unit being mounted on the work machine;
a communication unit configured to transmit the communications carrier information and the positional information to the outside of the work machine, the communication unit being mounted on the work machine;
a communication state analyzing unit configured to associate the communications carrier information and the positional information included at two or more different times with each other among pieces of the communications carrier information and the positional information transmitted from the communication unit, the associating being performed for each of the times; and
a determining unit configured to determine whether an abnormality occurs in the communications carrier, from at least one of a change over time in the number of the pieces of the communications carrier information acquired by the communication state analyzing unit and a change over time in a rate of the communications carrier information among a plurality of the communications carriers.

4. The communication management system of claim 3, further comprising
an output unit configured to display the communications carrier information associated with the positional information in a position on a map corresponding to the positional information.

5. The communication management system of claim 4, wherein the output unit displays the communications carrier information associated with the positional information in the position on the map corresponding to the positional information, the displaying being performed for each of the two or more different times.

6. A communication management system in which a work machine communicates with an outside of the work machine, the communication management system comprising:
the work machine including: a communications carrier setting unit configured to set a communications carrier that provides a communication service to generate information about the set communications carrier as communications carrier information; and a communication unit configured to transmit the communications carrier information to the outside of the work machine;
a communication state analyzing unit configured to gather statistics on the communications carrier information included at two or more different times among pieces of the communications carrier information transmitted from the communication unit, the statistics gathering being performed for each of the times; and a determining unit configured to determine whether an abnormality occurs in the communications carrier, from at least one of a change over time in the number of the pieces of the communications carrier information acquired by the communication state analyzing unit and a change over time in a rate of the communications carrier information among a plurality of the communications carriers, wherein the communication state analyzing unit generates time-series data by arranging the communications carrier information in chronological order after the statistics gathering.

7. A communication management method to be implemented where a work machine communicates with an outside of the work machine, the communication management method comprising:

setting a communications carrier to be used by the work machine to perform communications, and generating information about the set communications carrier as communications carrier information;

transmitting the communications carrier information to the outside of the work machine;

gathering statistics on the communications carrier information included at two or more different times among pieces of the communications carrier information transmitted from the communication unit, the statistics gathering being performed for each of the times;

arranging the communications carrier information in chronological order after the statistics gathering; and determining whether an abnormality occurs in the communications carrier, from at least one of a change over time in the number of the pieces of the communications carrier information from the gathered statistics and a change over time in a rate of the communications carrier information among a plurality of the communications carriers.

8. A communication management method to be implemented where a work machine communicates with an outside of the work machine, the communication management method comprising:

setting a communications carrier to be used by the work machine to perform communications, and generating information about the set communications carrier as communications carrier information;

transmitting the communications carrier information and positional information about the work machine to the outside of the work machine;

associating the communications carrier information and the positional information included at two or more different times with each other among pieces of the communications carrier information and the positional information transmitted from the communication unit, the associating being performed for each of the times;

determining whether an abnormality occurs in the communications carrier, from at least one of a change over time in the number of the pieces of the communications carrier information from the gathered statistics and a change over time in a rate of the communications carrier information among a plurality of the communications carriers; and displaying the communications carrier information associated with the positional information in a position on a map corresponding to the positional information, the displaying being performed for each of the two or more times.

\* \* \* \* \*